United States Patent [19]

Beresford

[11] Patent Number: 5,002,358
[45] Date of Patent: Mar. 26, 1991

[54] OPTICAL FIBRE CABLE CORE FOR SUBMARINE USE

[75] Inventor: David M. Beresford, Palmers Green, England

[73] Assignee: Telephone Cables Limited, England

[21] Appl. No.: 472,219

[22] Filed: Jan. 30, 1990

[30] Foreign Application Priority Data

Feb. 6, 1989 [GB] United Kingdom ............... 8902552

[51] Int. Cl.⁵ .............................................. G02B 6/44
[52] U.S. Cl. .................................................. 350/96.23
[58] Field of Search ........................... 350/96.23, 96.34

[56] References Cited

U.S. PATENT DOCUMENTS

| | | | |
|---|---|---|---|
| 4,679,897 | 7/1987 | Driskel | 350/96.23 |
| 4,690,499 | 9/1987 | Taylor et al. | 350/96.23 |
| 4,772,089 | 9/1988 | Ide et al. | 350/96.23 |
| 4,778,244 | 10/1988 | Ryan | 350/96.23 |
| 4,846,566 | 7/1989 | Barnett et al. | 350/96.23 |

FOREIGN PATENT DOCUMENTS

| | | |
|---|---|---|
| 2052092 | 1/1981 | United Kingdom . |
| 2187305 | 9/1987 | United Kingdom . |
| 2187306 | 9/1987 | United Kingdom . |

Primary Examiner—John D. Lee
Attorney, Agent, or Firm—Kirschstein, Ottinger, Israel & Schiffmiller

[57] ABSTRACT

A submarine cable having an optical fibre core includes, as a longitudinal strength member of the core, a thermotropic plastics tube (8) having a generally rectangular-section longitudinal central passage and encased in a protective sheath (4), and at least one optical fibre ribbon (6), whose width is slightly less than the width of the passage, housed loosely within the passage, the ribbon (6) thereby being constrained to undulate in two dimensions in a longitudinal plane normal to its major surfaces. Preferably the tube (8) has a thickness substantially smaller than its width, so that its outer surface is also generally rectangular in section.

6 Claims, 2 Drawing Sheets

OPTICAL FIBRE CABLE CORE FOR SUBMARINE USE

BACKGROUND OF THE INVENTION

This invention relates to the core of an optical fibre cable, especially, but not exclusively, for submarine telecommunications.

SUMMARY OF THE INVENTION

The purpose of the present invention is to provide such a cable with a compact structure in which the optical fibres are protected from undue longitudinal strain over a wide range of operating temperatures.

Accordingly, the invention provides an optical fibre core for submarine cable, comprising, as the sole longitudinal strength member of the core, a thermotropic plastics tube having a generally rectangular-section longitudinal central passage and encased in a protective sheath, and at least one optical fibre ribbon, whose width is slightly less than the width of the passage, housed loosely within the passage, the ribbon thereby being constrained to undulate in two dimensions in a longitudinal plane normal to its major surfaces.

The invention also provides a method of manufacture of an optical fibre core for submarine cable, comprising co-extruding a thermotropic plastics tube having a generally rectangular-section longitudinal central passage and a surrounding protective sheath so that the sheath encases the tube, and feeding loosely at least one optical fibre ribbon into the passage, the ribbon having a width slightly less than the width of the passage so that the ribbon is constrained to undulate in two dimensions in a longitudinal plane normal to its major surfaces.

The tube preferably has a thickness substantially smaller than its width, so that its outer surface is also generally rectangular in section. Its wall thickness is preferably uniform when viewed in cross-section.

According to a further aspect, the invention provides an optical fibre core for submarine cable, comprising, as the sole longitudinal strength member of the core, a thermotropic plastics tube having a longitudinal central passage and encased in a protective sheath, and at least one optical fibre ribbon, whose width is slightly less than the width of the passage, housed loosely within the passage, the plastics tube being laid straight in the core.

The plastics tube does not undergo any appreciable thermal expansion over the normal operating range of temperatures, so that the amount of longitudinal overfeed of the optical fibre ribbon within the tube is maintained constant.

A preferred material for the plastics tube is thermotropic liquid crystal polymer (LCP), or compositions including one or more of such polymers, optionally blended with conventional thermoplastic material or materials.

The ribbon is preferably part of a rectangular-section, integral stack of such ribbons, and the cavity between the ribbon or stack and the tube is preferably filled with a water-blocking lubricant such as a thixotropic gel.

The sheath may be of plastics material, preferably a thermosetting or a thermoplastics polymer.

One way in which the invention is performed will now be described, by way of example only, with reference to the accompanying schematic drawing, in which:

DETAILED DESCRIPTION OF THE PREFERRED EMBODIMENTS

Figure 1:
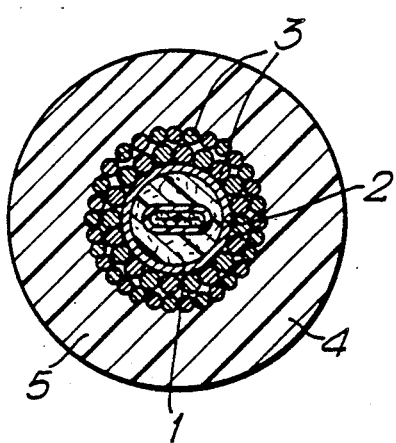
FIG. 1 is a cross-sectional view of an optical fibre submarine telecommunications cable embodying the invention.
Figure 2:
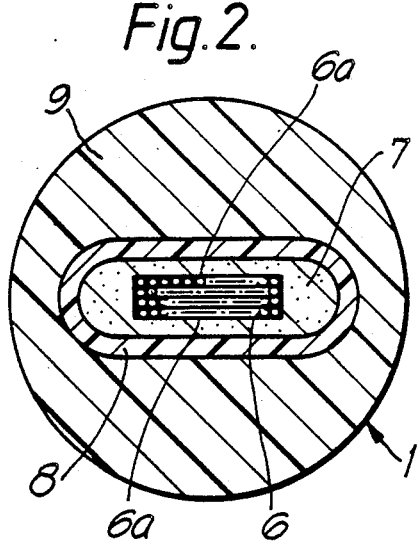
FIG. 2 is a cross-sectional view to an enlarged scale of the core of the cable of FIG. 1.

With reference first to FIGS. 1 and 2, the optical fibre cable comprises an optical fibre core 1 surrounded by a metallic tube 2. The tube 2 is surrounded by two torsionally-balanced strain wire layers 3, and an outermost plastics sheath 4. The metallic tube 2, preferably of copper, forms an hermetic barrier against moisture and hydrogen penetration, and also provides hydrostatic pressure resistance; in some applications, it may also be used as an electrical power feed.

The strain wire layers 3 provide the cable with a satisfactory strength-to-weight ratio and a matched tensile performance, bending stiffness and breaking load. A low modulus silicone water-blocking compound occupies the spaces between the wire layers 3 and between the individual wires to limit water ingress.

The outermost plastics sheath 4 is, in this example, of polyethylene, and protects the strain wires and the inner parts of the cable from sea water. The wires are conveniently of steel.

The optical fibre unit 1, shown more clearly in FIG. 2, comprises a stack 6 of four superimposed identical optical fibre ribbons, each ribbon comprising twelve optical fibres encased in plastics material such as a U-V curable resin. Such stacks are well known, and will not be described here. The stack 6 is housed loosely in a rectangular-section tube 8 of thermotropic liquid crystal polymer material, the dimensions in this example being 3.8 mm×2.6 mm with a 0.3 mm wall thickness. The stack 6 is constrained to undulate in only two dimensions, in the plane normal to its major surfaces 6a. In this way, the tube 8 accommodates a length of optical fibre ribbon greater than its own length so that the ribbon is overfed by a predetermined proportion. The amount of overfeed is calculated to ensure a longitudinal strain margin in the optical fibre cable of between 0.5 and 1%.

The tube 8 is laid straight with respect to the cable; no helical or reversing helical lay is necessary, in contrast to some previous proposals.

The cavity 7 between the stack 6 and the tube 8 is filled with a water-blocking medium preferably incorporating a hydrogen scavenger.

The diameter of the core 6, 8, 9 may be as low as between 3 and 5 mm in cables accommodating sixteen optical fibres, and between 5 and 7 mm in cables accommodating between thirty-two and forty-eight optical fibres, such as the cable illustrated.

The degree of freedom of movement of the stack 6 within the tube 2, i.e. the amplitude of the undulations of the stack 6, depends on the amount of excess ribbon required, but in this example there is a gap of between 1 mm and 2 mm.

The material used to form the thermotropic plastics tube 8 may consist solely of liquid crystal polymer materials, or may be a blend of these and conventional thermoplastic materials. Some appropriate materials are disclosed for example in European Patent Application EP-A-0091253. The tube acts as a non-corrosive, non-metallic central strength member which provides a stiffening support and compression resistance for the optical fibres whilst accommodating the optical fibres such that they reside on the neutral axis of the optical fibre cable. This minimises the effects of cable bending, and allows a freedom of movement for the optical fibre ribbon arrays so as to provide the required amount of cable strain relief. The low coefficient of linear thermal expansion minimises the mismatch in expansion and contraction behaviour between the tube 8 and the stack 6, thus providing a wide temperature tolerance for effective operation of the cable. It also ensures that the level of excess ribbon length does not alter to the detriment of the optical or mechanical performance, as a result of ambient temperature fluctuations, or temperature variations associated with any secondary process or processes such as the application of the metallic barrier tube 2 during manufacture.

The outermost abrasion-resistant sheath 9 may be of nylon or polyethylene or another appropriate thermoplastic or thermosetting polymer.

The cable core 1 is manufactured firstly by co-extruding the tube 8 with the sheath 9, using conventional extrusion techniques. The extrusion conditions, such as the die configuration, melt temperatures, draw-down ratio and cooling regime, are selected to tailor the desired properties of the tube by controlling the amount of molecular orientation. Thermotropic liquid crystalline polymers have especially high tensile moduli and very low coefficients of linear thermal expansion relative to conventional thermoplastics materials, and their properties can be adjusted in this manner.

Secondly, the stack 6 is fed into the tube 8 at a predetermined rate such as to provide a precisely-controlled amount of excess ribbon length.

The metallic tube 2 is formed, in this example, from tape sealed by cold pressure welding, but alternative processes include resistance or torch welding, swaging down, or the use of extrusion or conforming.

Although the plastics sheath 4 has been described as the outermost layer, additional abrasion or crush or impact resistance, or additional tensile strength, can be provided with the use of a further armouring layer (not shown).

The amount of excess length of the optical fibre stack 6 may be increased by causing the liquid crystal polymer tube 8 to undulate relative to the axis of the outer sheath 9. Cyclic undulations or displacements may be achieved either by rotation about the cable axis or by displacement solely in a plane parallel to the major surfaces of the tube 8. Cyclic axial rotation may be achieved by rotating the die at the exit point of the extruder cross head, or downstream from the extruder but before the point at which the outer sheath 9 is applied. Cyclic planar displacement may be provided by an appropriate oscillation of the die, so that the tube 8 is displaced before the application of the outer sheath 9.

Figure 3:
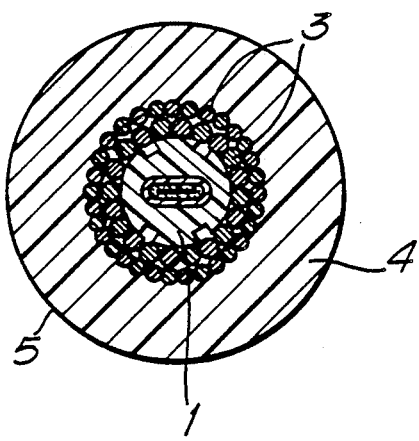
FIG. 3 is a view corresponding to FIG. 1 of an alternative form of cable.

An alternative form of cable is illustrated in FIG. 3, in which the metallic barrier tube 2 is omitted. Instead, the barrier properties of the tube 8 are relied on for preventing the ingress of hydrogen. This cable is unlikely to tolerate substantial hydrostatic pressure in deep water, but the cable has the advantage of being lighter, smaller and cheaper to manufacture.

Figure 4:
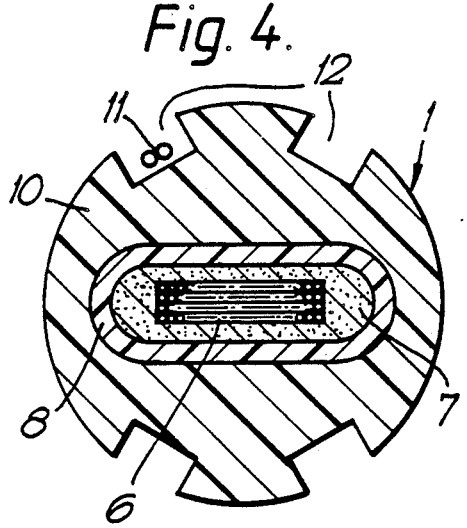
FIGS. 4, 5 and 6 are views corresponding to FIG. 2 of alternative constructions of the core; corresponding parts being denoted by identical reference numerals.

An alternative form of the cable core 1 is illustrated in FIG. 4, in which the outer abrasion-resistant sheath 9 of FIG. 2 is replaced with a sheath 10 with any number of straight, helical, or S-Z reversing helical grooves 12 in its surface. These grooves accommodate any number of copper conductors 11 for electric power transmission or signalling purposes, and additional water-blocking medium incorporating a hydrogen scavenger.

Figure 5:
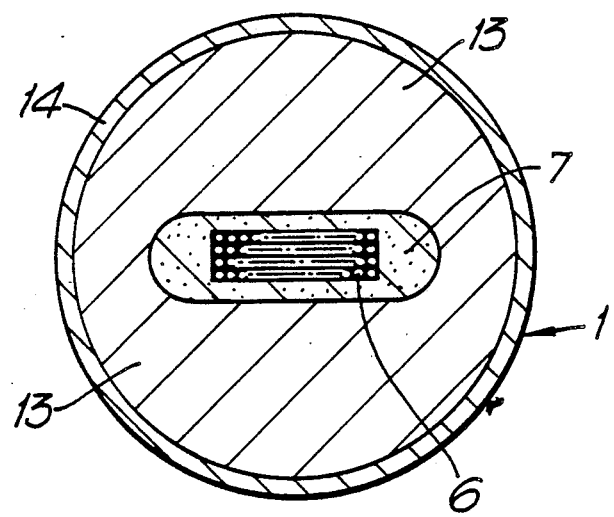

As shown in FIG. 5, the optical fibre core 1 has a liquid crystal polymer tube 13 which differs from that of FIG. 2 in that its external shape is cylindrical. Nevertheless, it has a central passage of generally rectangular section, identical to that of the tube 8 of FIG. 2, for accommodating the stack 6. Instead of the sheath 9 of FIG. 2, there is a thin outer layer 14 of the abrasion-resistant material.

Figure 6:
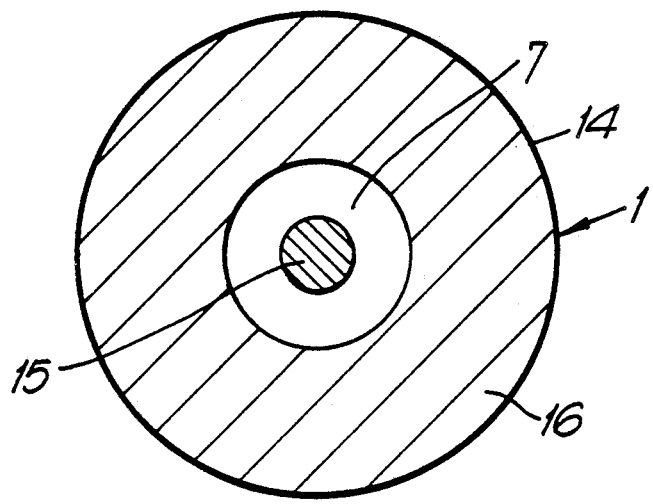

In the modification shown in FIG. 6, the liquid crystal polymer tube 16 has a cylindrical passage 7 loosely containing one or more individual fibre elements or fibre bundles or fibres embedded in a U-V curable matrix 15.

The tube 16 is dual-extruded with a thin layer 14 of abrasion-resistant polymeric material similar to layer 9 of FIG. 2. The optical element(s) 15 is or are fed into the tube 16 at a rate predetermined to introduce a precise amount of excess fibre length, and hence of fibre strain relief. Thus the unit 1 is produced in a single process.

Conductors may be housed in peripheral grooves (not shown) in the optical unit 1 of FIG. 6, as shown in FIG. 4, and a metallic barrier tube 2 may be provided between the unit 1 and the wire layers 3, depending on specific requirements.

The increased thickness of the creep-resistant thermotropic liquid crystal polymer provides an improved resistance to hydrostatic pressure, so that the cable can tolerate greater water depths even without the use of a metallic tube 2.

In a further variation of the cable of FIG. 1, the metallic barrier tube 2 is made from lead instead of copper, simplifying the process for its manufacture.

I claim:

1. An optical fibre core for a submarine cable having a central longitudinal cable axis, the core comprising, as a longitudinal strength member of the core:
   (a) an elongated thermotropic plastics tube at least partly composed of a thermotropic liquid crystal polymer and extending linearly along the central longitudinal cable axis, said tube having a generally rectangular-section longitudinal central passage formed with a passage width, said tube having an outer surface of generally rectangular-section, said tube having a wall thickness of uniform cross-section and a thickness substantially smaller than its width;
   (b) a protective sheath encasing said tube; and
   (c) at least one optical fibre ribbon of generally rectangular-section and having major surfaces, said ribbon having a width which is slightly less than the width of the passage, said ribbon being housed loosely within said passage, said ribbon thereby being constrained to undulate in two dimensions in a longitudinal plane normal to said major surfaces.

2. A core as claimed in claim 1 wherein said ribbon is part of an integral stack of such ribbons.

3. A core as claimed in claim 1 wherein the tube is surrounded by at least on strain wire layer.

4. A core as claimed in claim 1 wherein said tube is encased in a protective sheath, said sheath having a material selected from the group containing thermosetting and thermoplastic polymer(s).

5. A submarine cable having a central longitudinal cable axis and an optical fibre core, the core comprising, as a longitudinal strength member of the core:
(a) an elongated thermotropic plastics tube at least partly composed of a thermotropic liquid crystal polymer and extending linearly along the central longitudinal cable axis, said tube having a generally rectangular-section longitudinal central passage formed with a passage width, said tube having an outer surface of generally rectangular-section, said tube having a wall thickness of uniform cross-section and a thickness substantially smaller that its width;
(b) at least one strain wire layer surrounding said tube;
(c) a protective sheath encasing said tube and said strain wire layer; and
(d) at least one optical fibre ribbon of generally rectangular-section and having major surfaces, said ribbon having a width which is slightly less than the width of the passage, said ribbon being housed loosely within said passage, said ribbon thereby being constrained to undulate in tow dimensions in a longitudinal plane normal to said major surfaces.

6. A method of manufacture of an optical fibre core for submarine cable having a central longitudinal cable axis, comprising the steps of: co-extruding an elongated thermotropic plastics tube at least partly of a thermotropic liquid crystal polymer, and linearly along the central longitudinal cable axis, said tube having a generally rectangular-section longitudinal central passage formed with a passage width, said tube having an outer surface of generally rectangular-section, said tube having a wall thickness of uniform cross-section and a thickness substantially smaller than its width and a surrounding protective sheath so that the sheath encases the tube, and feeding loosely at least one optical fibre ribbon of generally rectangular-section and having major surfaces into the passage, the ribbon having a width slightly less than the width of the passage so that the ribbon is constrained to undulate in two dimensions in a longitudinal plane normal to said major surfaces.

* * * * *